(12) United States Patent
Kim et al.

(10) Patent No.: US 7,687,199 B2
(45) Date of Patent: Mar. 30, 2010

(54) SECONDARY BATTERY

(75) Inventors: Jinwook Kim, Yongin-si (KR); Jaeil Seong, Yongin-si (KR); Hideaki Yoshio, Yongin-si (KR); Sangdae Hwang, Yongin-si (KR); Jiwan Jeong, Yongin-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 229 days.

(21) Appl. No.: 12/068,225

(22) Filed: Feb. 4, 2008

(65) Prior Publication Data

US 2009/0075169 A1   Mar. 19, 2009

(30) Foreign Application Priority Data

Sep. 14, 2007  (KR) ................ 10-2007-0093698

(51) Int. Cl.
  *H01M 2/02* (2006.01)
  *H01M 2/08* (2006.01)
(52) U.S. Cl. .............. 429/185; 429/175; 429/180
(58) Field of Classification Search .......... 429/185, 429/89, 175, 180
  See application file for complete search history.

(56) References Cited

U.S. PATENT DOCUMENTS

2006/0257733 A1* 11/2006 Kim et al. ............. 429/185

FOREIGN PATENT DOCUMENTS

| JP | 2004-119329 | 4/2004 |
|---|---|---|
| JP | 2007-103158 | 4/2007 |
| KR | 1020070092379 | 9/2007 |

* cited by examiner

*Primary Examiner*—Patrick Ryan
*Assistant Examiner*—Brent Thomas
(74) *Attorney, Agent, or Firm*—Robert E. Bushnell, Esq.

(57) ABSTRACT

A secondary battery which can prevent leakage of an electrolytic solution by improving the sealing property of an electrolytic solution injection hole formed at a cap plate comprises: an electrode assembly including a cathode plate, a separator and an anode plate; a can having an upper opening for receiving the electrode assembly; and a cap assembly which is combined with the upper opening of the can, and which includes a cap plate provided with an electrolytic solution injection hole at one side thereof. A groove is formed in an axial direction on an inner circumferential surface of the electrolytic solution injection hole. Thus, the contact area between a stopper and the electrolytic solution injection hole is increased, thereby improving the sealing property of the electrolytic solution injection hole.

12 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on the 14 Sep. 2007 and there duly assigned Serial No. 10-2007-0093698.

BACKGROUND OF THE INVENTION

1. Field of the Invention

The present invention relates to a secondary battery and, more particularly, to a secondary battery that can improve the sealing property of an electrolytic solution injection hole.

2. Description of the Prior Art

Generally, a secondary battery is a battery which can be repeatedly charged and discharged, differently from a disposable battery which is not rechargeable. The secondary battery has been widely used for advanced electronic devices such as cellular phones, portable computers and camcorders. A lithium secondary battery has a 3.6V operating voltage, which is three times greater than that of a nickel-cadmium battery or a nickel-hydrogen battery, and it has a higher energy density per unit weight compared to other types of batteries. Thus, the lithium secondary battery has been rapidly developed in recent years.

The lithium secondary battery uses lithium group oxides as a cathode active material, and carbonic material as an anode active material. Generally, lithium secondary batteries are divided into liquid electrolyte batteries and polymer electrolyte batteries according to the kind of electrolyte used. A battery using a liquid electrolyte is called a lithium ion battery and a battery using a polymer electrolyte is called a lithium polymer battery. The lithium secondary battery is manufactured in various types, typically, cylindrical, angular and pouch types.

Generally, an electrolytic solution injection hole is formed at a cap plate of the secondary battery for injecting a liquid electrolyte into the secondary battery. A stopper is seated on the electrolytic solution injection hole, and the electrolytic solution injection hole is sealed by pressing the stopper.

However, the electrolytic solution leaks when a gap is generated between an outer circumferential surface of the stopper pressed in the electrolytic solution injection hole and an inner circumferential surface of the electrolytic solution injection hole. The leaked electrolytic solution causes sparks at the time of welding of an outer surface of the stopper, and simultaneously generates dregs, such as black dirt. Thus, a pin-hole is formed between inner circumferential surfaces of the stopper and electrolytic solution injection hole, thereby lowering the sealing property of the electrolytic solution injection hole prominently.

SUMMARY OF THE INVENTION

An object of the present invention is to provide a secondary battery which can improve the sealing property of an inner circumferential surface of an electrolytic solution injection hole by using a stopper.

Additional advantages, objects and features of the invention will be set forth in part in the description which follows, and in part will become apparent to those having ordinary skill in the art upon examination of the following, or may be learned from practice of the invention.

According to one aspect of the present invention, a secondary battery comprises: an electrode assembly including a cathode plate, a separator and an anode plate; a can having an upper opening so as to receive the electrode assembly; and a cap assembly which is combined with the upper opening of the can and which includes a cap plate provided with an electrolytic solution injection hole at its one side; wherein a groove is formed in an axial direction on an inner circumferential surface of the electrolytic solution injection hole.

The groove may be a plurality of vertical grooves formed in parallel with each other on the inner circumferential surface of the electrolytic solution injection hole.

The groove may have a trapezoidal sectional surface vertical to the axial direction.

At least one stepped part may be formed at an upper part of the groove on the inner circumferential surface of the electrolytic solution injection hole.

A first stepped part may be formed at an upper part of the groove on the inner circumferential surface of the electrolytic solution injection hole, and a second stepped part may be formed at an upper part of the first stepped part.

A horizontal groove may be formed on an upper surface of the first stepped part concentrically with the electrolytic solution injection hole.

An inclined part may be formed at an upper end and/or a lower end of the groove.

According to another aspect of the present invention, a secondary battery comprises: an electrode assembly including a cathode plate, a separator and an anode plate; a can having an upper opening so as to receive the electrode assembly; and a cap assembly combined with the upper opening of the can, and provided with a cap plate including an electrolytic solution injection hole formed at its one side; wherein a groove is formed in an axial direction on an inner circumferential surface of the electrolytic solution injection hole, a stepped part is formed at an upper part of the groove, and a sealing material is coated on a surface of the stepped part.

A horizontal groove may be formed on a plane surface of the stepped part concentrically with the electrolytic solution injection hole and may be filled with the sealing material.

The sealing material may be formed by drying a solvent made of resin or rubber. The resin may be a fluorine type resin or a polyolefin type resin. The rubber may be a fluorine type rubber, a butadiene rubber or an isobutylene-isoprene rubber.

Furthermore, a second stepped part having a diameter larger than that of the electrolytic solution injection hole may be formed at an upper part of the stepped part.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
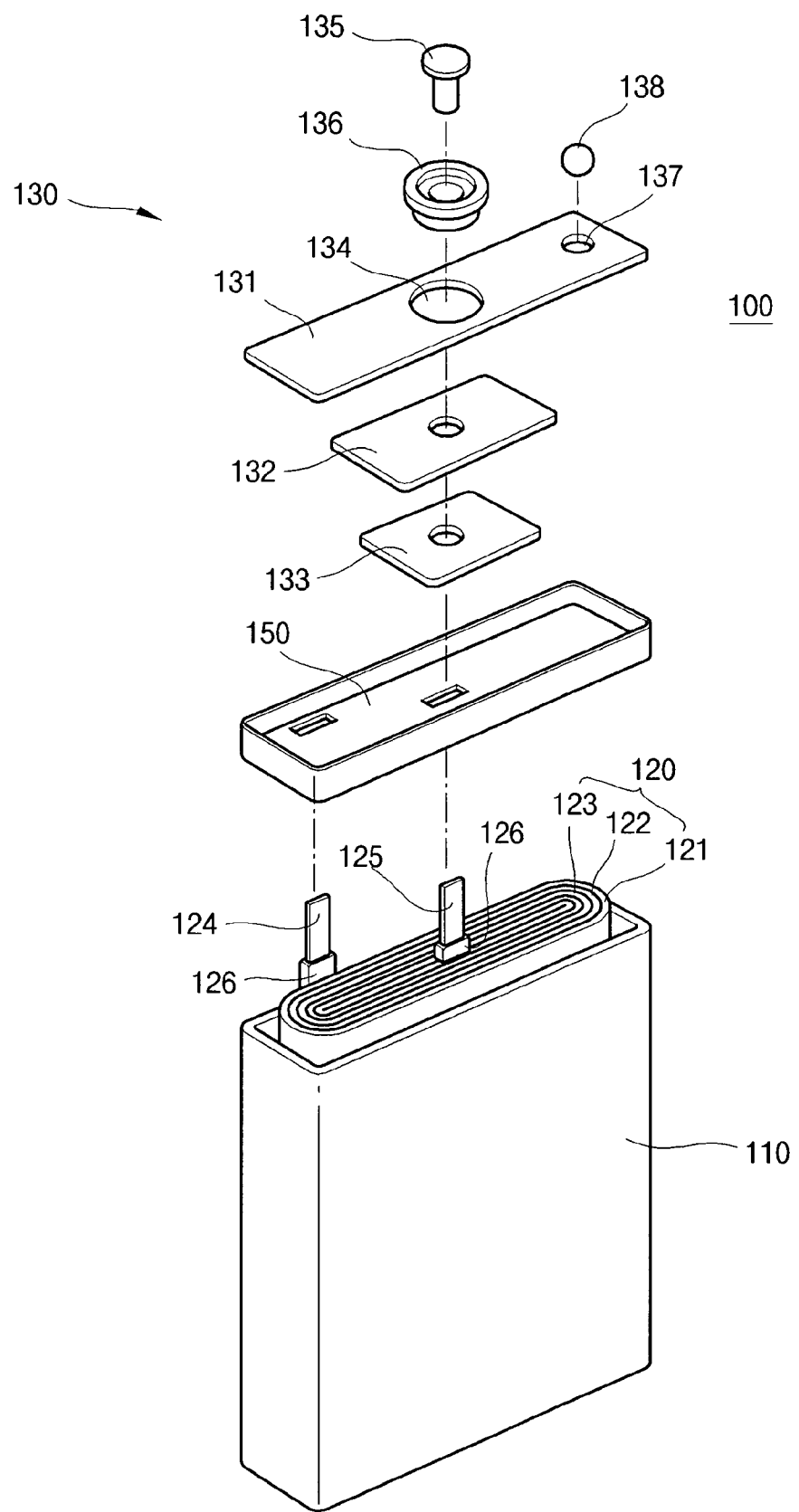
FIG. 1 is an exploded perspective view of a secondary battery according to an embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements throughout the various figures.

Figure 2:
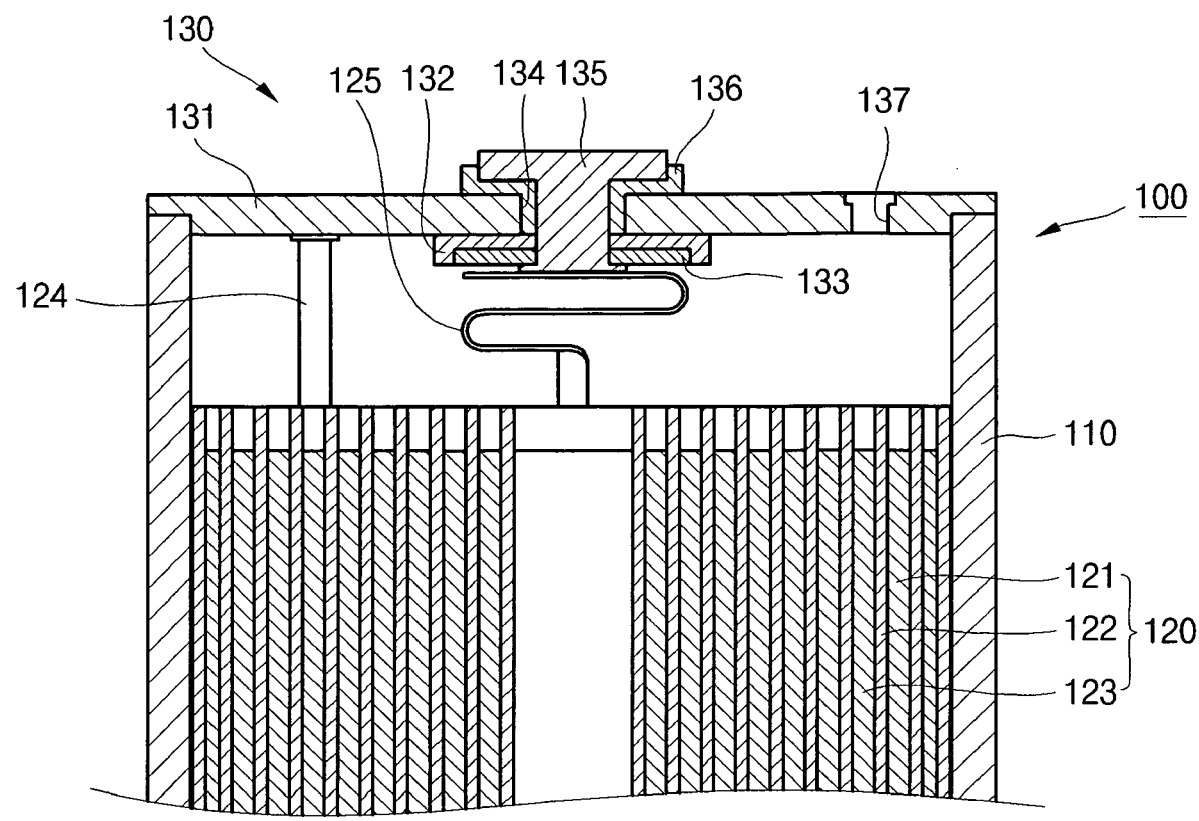
FIG. 2 is a sectional view of a combined state in which a stopper is separated from the secondary battery of the embodiment of FIG. 1.

FIG. 1 is an exploded perspective view of a secondary battery according to an embodiment of the present invention, and FIG. 2 is a sectional view of a combined state in which a stopper is separated from the secondary battery of the embodiment of FIG. 1.

Referring to FIGS. 1 and 2, a secondary battery 100 according to an embodiment of the present invention includes a can 110, an electrode assembly 120 received in the can 110, and a cap assembly 130 covering an open upper end part of the can 110.

The can 110 is a rectangular cylindrical body having an upper end part which is opened, and is made of metal. The can 110 itself can function as an electrode terminal. The electrode assembly 120 received in the can 110 includes a cathode plate 121, a separator 122 and an anode plate 123 in that order, and the electrode assembly 120 is wound in a jelly roll type.

The cathode plate 121 includes a cathode collector made of a thin aluminum plate, and a slurry having lithium group oxides as a main component is coated on both surfaces of the cathode collector. The anode plate 123 includes an anode collector made of a thin copper plate, and a slurry having carbonic material as a main component is coated on both surfaces of the anode collector.

A cathode tab 124 and anode tab 125, parts of which protrude above the electrode assembly 120, are respectively withdrawn out from the cathode and anode plates 121 and 123, respectively. The cathode and anode tabs 124 and 125, respectively, may be fixed to the cathode and anode collectors by welding.

The cathode and anode tabs 124 and 125, respectively, may be arranged so as to have different polarities relative to each other. An insulating tape 126 may be wrapped on the parts where the cathode and anode tabs 124 and 125, respectively, protrude to the outside of the cathode and anode plates 121 and 123, respectively, so as to prevent an electrical short between the plates 121 and 123.

The cap assembly 130 is installed on the open upper end part of the can 110. The cap assembly 130 includes a cap plate 131, an insulating plate 132 installed so as to be in contact with a lower surface of the cap plate 131, and a terminal plate 133 installed so as to be in contact with a lower surface of the insulating plate 132.

A terminal through-hole 134 is formed in the middle of the cap plate 131, and an anode terminal 135 passing through the inside of the can 110 is installed in the terminal through-hole A gasket 136 is installed on an outer surface of the anode terminal 135 so as to insulate the anode terminal 135 from the cap plate 131. The anode terminal 135 is electrically coupled to the terminal plate 133, and is combined with it.

An insulating case 150 can be further installed at an upper part of the electrode assembly 120 in the can 110.

The cathode tab 124 is fixed and electrically coupled to the cap plate 131 by welding or the like, and the anode tab 125 is fixed and electrically coupled to the anode terminal 135 by welding or the like. Conversely, the battery may be designed so as to change the polarities of the electrodes relative to each other.

Furthermore, the construction of the cap assembly 130 is not limited to that described above.

An electrolytic solution injection hole 137 is formed on one side of the cap plate 131 so as to provide a means for filling an electrolytic solution into the can 110, and the electrolytic solution injection hole 137 is sealed by a ball type stopper 138.

Figure 3:
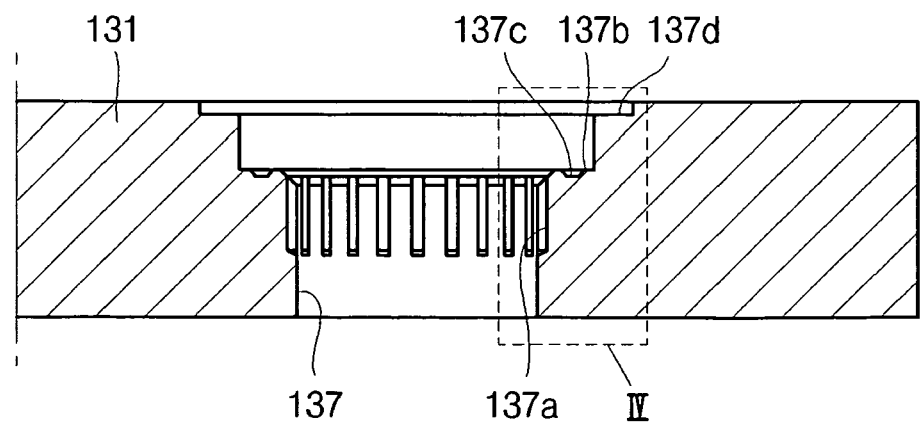
FIG. 3 is a magnified sectional view of an electrolytic solution injection hole according to a first exemplary embodiment of the present invention.
Figure 4:
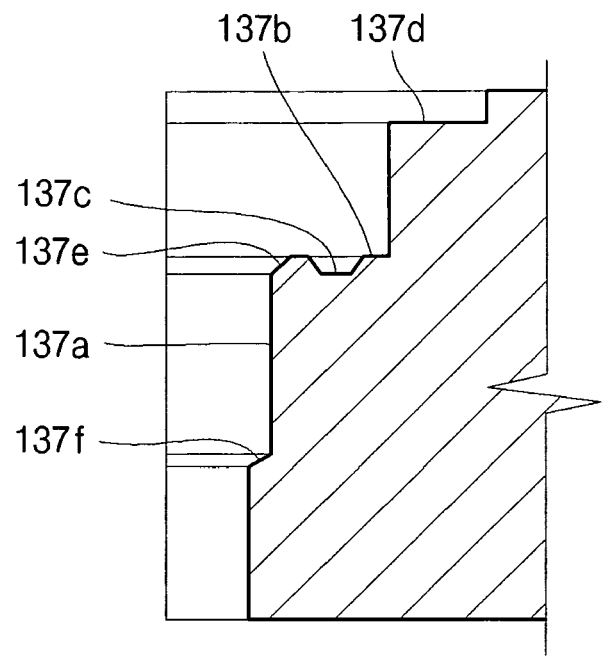
FIG. 4 is a magnification view of portion "IV" of FIG. 3.
Figure 5:
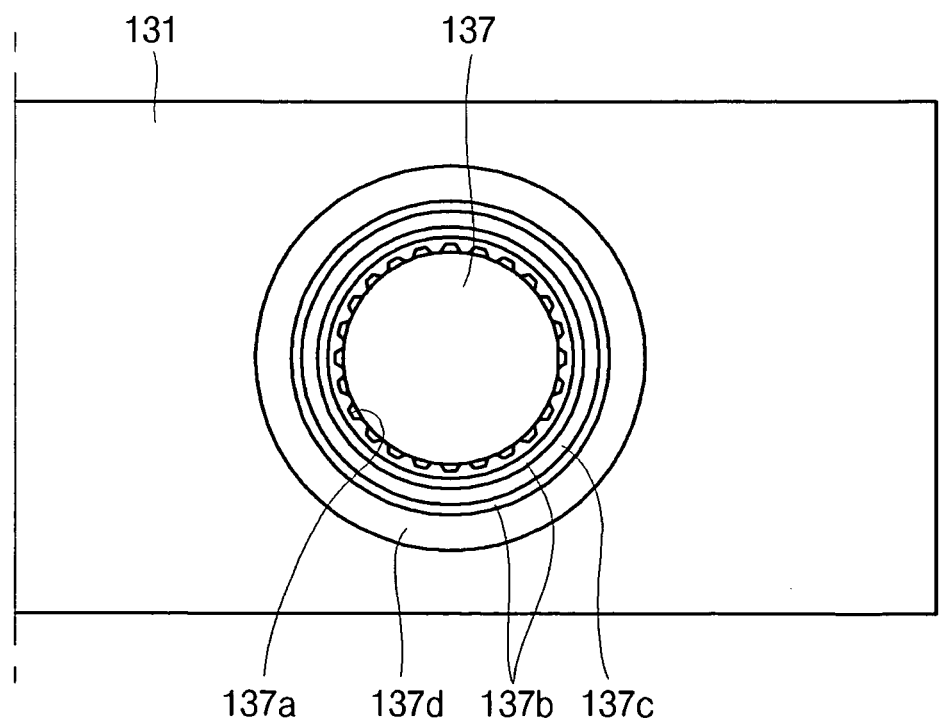
FIG. 5 is a plan view of FIG. 3.

FIG. 3 is a magnified sectional view of an electrolytic solution injection hole according to a first exemplary embodiment of the present invention, FIG. 4 is a magnification view of portion "IV" of FIG. 3, and FIG. 5 is a plan view of FIG. 3.

Referring to FIGS. 3 thru 5, the shape of the electrolytic solution injection hole 137 will be explained below.

As shown in FIGS. 3 and 4, a plurality of vertical grooves 137a are formed on an inner circumferential surface of the electrolytic solution injection hole 137 with parallel gaps with respect to each other. In this drawing of the embodiment, it is shown that about twenty vertical grooves 137a are formed, but the invention is not limited thereto. As the vertical grooves 137a increase in number, the width and gap of the vertical grooves 137a become narrower.

The vertical grooves 137a may be formed with constant gaps therebetween or with different gaps therebetween. The gaps are formed so as to tightly fit the stopper on the inner circumferential surface of the electrolytic solution injection hole 137. Furthermore, the widths and gaps of the vertical grooves 137a may be formed in proper sizes.

As shown in FIG. 5, the vertical groove 137a is formed in the shape of a trapezoid which becomes narrower from a surface of the inner circumferential surface of the electrolytic solution injection hole 137 to its inside when it is observed from a plan view or vertically cut sectional surface. Similarly, when the vertical groove 137a is formed in a trapezoidal shape, the stopper 138 is more tightly fitted. However, the shape of the vertical groove 137a is not limited thereto, and it may be formed in triangular, rectangular, circular or polygonal shapes.

A first stepped part 137b is formed at an upper part of the vertical groove 137a formed on the inner circumferential surface of the electrolytic solution injection hole 137. The first stepped part 137b increases the area in contact with the stopper 138 pressed into the electrolytic solution injection hole 137, thereby improving sealing property. This means that the electrolytic solution leaking path becomes longer.

As shown in FIG. 5, the first stepped part 137b includes a horizontal groove 137c having the shape of a concentric circle relative to the electrolytic solution injection hole 137. When the stopper 138 is pressed in, it is fitted in the horizontal groove 137c, thereby preventing return flow of the electrolytic solution.

Furthermore, a second stepped part 137d is formed at an upper part of the first stepped part 137b. The second stepped part 137d also increases the area in contact with the stopper 138 pressed in. In addition, a horizontal groove (not shown) may be formed on a plane surface of the second stepped part 137d.

Third and fourth stepped parts may also be formed, in addition to the first and second stepped parts, and the number and position thereof are not limited.

A first inclined part 137e is formed at a border portion between the vertical groove 137a and the first stepped part 137b. Furthermore, a second inclined part 137f is formed at a lower end part of the vertical groove 137a.

The first inclined part 137e and second inclined part 137f mainly guide the stopper so as to be smoothly contacted and inserted into the vertical groove 137a formed in the axial direction on the inner circumferential surface of the electrolytic solution injection hole 137.

It is desirable that the stopper 138 pressed into the electrolytic solution injection hole 137 be made of a material having a stiffness less than that of the cap plate 131. In other words, when the cap plate 131 is made of normal aluminum or aluminum alloy, the stopper 138 is made of a more flexible aluminum or aluminum alloy, or of a material having a stiffness less than that of aluminum.

The sealing operation of the electrolytic solution injection hole of the secondary battery will be explained below.

In assembling the secondary battery, the electrode assembly 120 is inserted into the can 110 and the upper opening of the can 110 is sealed by the cap assembly 130. The electrolytic solution is injected through the electrolytic solution injection hole 137 formed at one side of the cap plate 131, and the electrolytic solution injection hole 137 is sealed with the stopper 138. At this point, the stopper 138 is fixed in the electrolytic solution injection hole 137 by a pressing method. After an outer surface of the stopper 138 is pressed into the electrolytic solution injection hole 137, it may be welded or coated with a light curable resin, or the like.

Next, a process by which the stopper 138 is pressed into the electrolytic solution injection hole 137 will be explained in detail with reference to FIG. 6.

Figure 6:
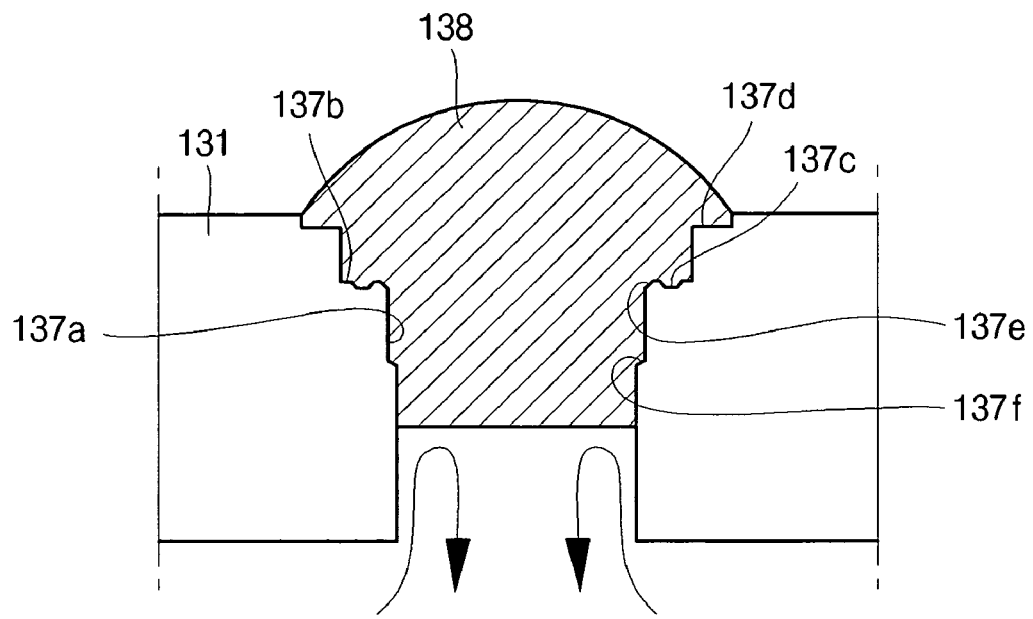
FIG. 6 is a sectional view of a state in which the electrolytic solution injection hole is closed by a stopper.

FIG. 6 is a sectional view of a state in which the electrolytic solution injection hole is closed by a stopper.

First, the stopper 138 is seated at an inlet of the electrolytic solution injection hole and is pressed into it. Then, the stopper 138 is sequentially fitted with the second stepped part 137d and the first stepped part 137b formed at the inlet of the electrolytic solution injection hole, and is pressed downwardly into it. At this point, the stopper 138 is also partially pressed into the horizontal groove 137c formed at the first stepped part 137b.

Subsequently, the stopper 138 is guided to the first inclined part 137e and is fitted into the plurality of vertical grooves 137a axially formed on the inner circumferential surface of the electrolytic solution injection hole 137. Thus, the shape of the outer surface of the stopper 138 is changed to a shape matching the shapes of the first stepped part 137b and the second stepped part 137d.

When the stopper 138 is fitted into the vertical groove 137a and is deformed, the stopper 138 consequently tightly contacts the inner circumferential surface of the electrolytic solution injection hole 137 because the vertical groove 137a is longitudinally formed along an axial direction of the electrolytic solution injection hole 137.

Next, when the stopper 138 is more deeply pressed into the electrolytic solution injection hole 137 and passes the second inclined part 137f, the stopper 138 contacts the inner circumferential surface of the electrolytic solution injection hole located below the second inclined part 137f so as to maintain a sealed state.

Similarly, the contact area between the stopper 138 and the solution injection hole 137 is increased by the plurality of vertical grooves 137a, and accordingly the leaking path of the electrolytic solution becomes longer, thereby improving the sealing property of the electrolytic solution injection hole 137 by the stopper 138. Furthermore, the vertical grooves 137a are formed in concave and convex shapes together with adjacent grooves, thereby preventing leakage of the electrolytic solution and rotation of the stopper 138.

In addition, the stopper 138 is pressed in so as to be fitted into the second stepped part 137d and the first stepped part 137b formed at the inlet of the electrolytic solution injection hole Thus, the contact area between the stopper 138 and the solution injection hole 137 is increased, and the leaking path of the electrolytic solution is expanded, thereby improving the electrolytic solution sealing property.

Next, an electrolytic solution injection hole of a secondary battery according to another exemplary embodiment of the present invention will be explained with reference to FIG. 7.

Figure 7:
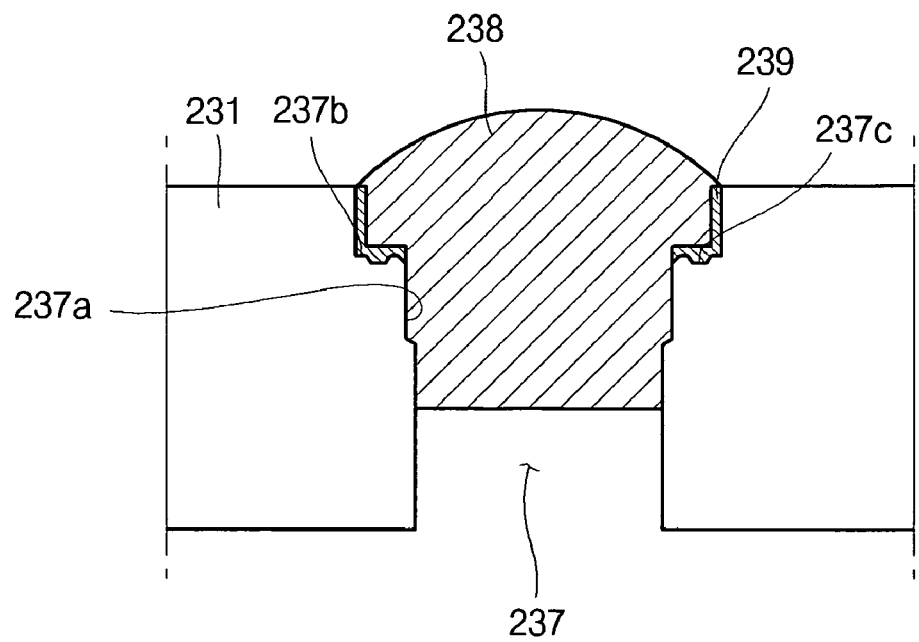
FIG. 7 is a sectional view of an electrolytic solution injection hole according to a second exemplary embodiment of the present invention.

FIG. 7 is a sectional view of an electrolytic solution injection hole according to a second exemplary embodiment of the present invention.

An inner circumferential surface of the electrolytic solution injection hole 237 is coated with a sealing material. That is, a stopper 238 may be pressed into the inner circumferential surface coated with the sealing material so as to seal the electrolytic solution injection hole 237.

The sealing material may be coated on the entire inner circumferential surface of the electrolytic solution injection hole 237. However, as shown in FIG. 7, it is desirable that the sealing material be coated on a partial region of the electrolytic solution injection hole 237.

A plurality of vertical grooves 237a are formed in an axial direction on the inner circumferential surface of the electrolytic solution injection hole 237 formed at one side of a cap plate 231. A first stepped part 237b is formed at an upper part of the vertical groove 237a, and a horizontal groove 237c is formed on a plane surface of the first stepped part 237b. The sealing material 239 is coated on a surface of the first stepped part 237b.

The sealing material 239 coated on the first stepped part 237b is coated so as to be filled in the horizontal groove 237c formed on the plane surface of the first stepped part 237b. Similarly, the sealing material 239 is filled in the horizontal groove 237c, thereby allowing the sealing material 239 to be strongly fixed to the electrolytic solution injection hole 239 without being separated from it.

The sealing material 239 is formed by drying a solvent made of resin or rubber. The resin contained in the liquid solvent may be a fluorine type resin or a polyolefin type resin. The rubber contained in the liquid solvent may be a fluorine type rubber, a butadiene rubber or an isobutylene-isoprene rubber.

The stopper 238 is pressed into the electrolytic solution injection hole 237 formed at the cap plate 231, and thus the sealing property is improved to a greater extent by the sealing material 239 interposed between the electrolytic solution injection hole 237 and the stopper 238. At this point, the stopper 238 is fitted into the vertical groove 237a while being deformed so as to increase the contact area, thereby improving the sealing property of the stopper 238 in a manner similar to the embodiment described above.

Figure 8:
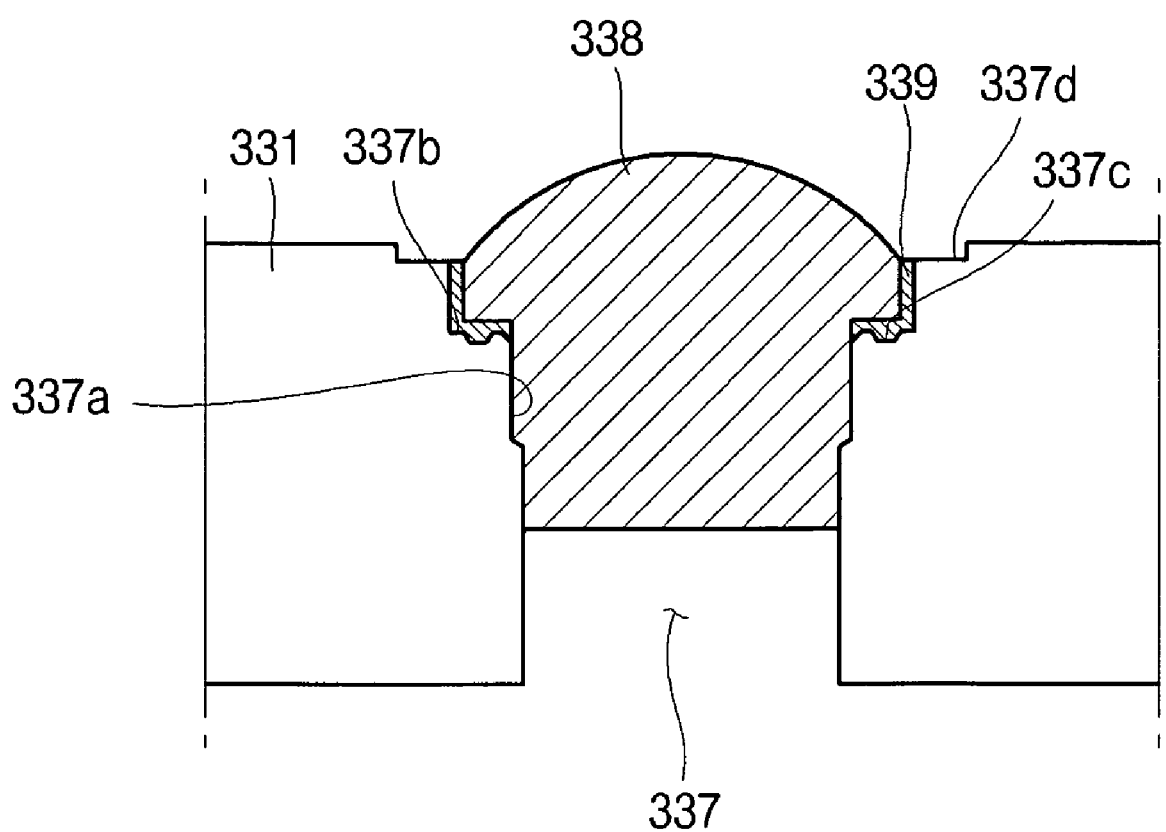
FIG. 8 is a sectional view of an electrolytic solution injection hole according to a third exemplary embodiment of the present invention.

FIG. 8 is a sectional view of an electrolytic solution injection hole according to a third exemplary embodiment of the present invention.

As in the embodiment of FIG. 7, a plurality of vertical grooves 337a are formed in an axial direction on an inner circumferential surface of an electrolytic solution injection hole 337. A first stepped part 337b is formed at an upper part of the vertical groove 337a, and a horizontal groove 337c is formed on a plane surface of the first stepped part 337b. A sealing material 339 is coated on a surface of the first stepped part 337b.

A second stepped part 337d is additionally formed at an upper part of the first stepped part 337b. The second stepped part 337d is formed in the shape of an expanded groove having a diameter larger that of the electrolytic solution injection hole 337.

The second stepped part 337d prevents the sealing material 239 from being exposed to an upper surface of a cap plate 331 during coating of the sealing material 339 on the inside of the electrolytic solution injection hole 337. Accordingly, the second stepped part 337d prevents a defect caused by the sealing material exposed to the upper surface of the cap plate 331 being separated or torn away from the electrolytic solution injection hole 337 during washing of the stopper 338 and its periphery.

The stopper 338 is pressed into the inner circumferential surface of the electrolytic solution injection hole 337 with interposed sealing material 339 so as to improve adherence between the stopper 338 and the inner circumferential surface of the electrolytic solution injection hole 337, and the electrolytic solution leaking path is elongated by the plurality of vertical grooves 337a axially formed and the first stepped part 337b formed at the upper part of the first stepped part 337b, thereby improving the sealing property.

As described above, the secondary battery according to the present invention produces the following advantageous effects.

First, the stopper is fitted into the inner circumferential surface of the electrolytic solution injection hole so as to increase the contact area and adherence between the stopper and the inner circumferential surface, thereby improving the sealing property of the electrolytic solution injection hole.

Second, the electrolytic solution leaking path is elongated by the axially formed groove and stepped part, thereby improving the sealing property of the electrolytic solution injection hole.

It should be understood by those of ordinary skill in the art that various replacements, modifications and changes in form and detail may be made therein without departing from the spirit and scope of the present invention, as defined by the following claims. Therefore, it is to be appreciated that the above described embodiments are for purposes of illustration only, and are not to be construed as limitations of the invention.

What is claimed is:

1. A secondary battery, comprising:
    an electrode assembly including a cathode plate, a separator and an anode plate;
    a can having an upper opening for receiving the electrode assembly; and
    a cap assembly which is combined with the upper opening of the can, and which includes a cap plate provided with an electrolytic solution injection hole at one side thereof;
    wherein a groove is formed in an axial direction on an inner circumferential surface of the electrolytic solution injection hole.

2. The secondary battery of claim 1, wherein the groove comprises a plurality of vertical grooves formed in parallel with each other on the inner circumferential surface of the electrolytic solution injection hole.

3. The secondary battery of claim 1, wherein the groove has a trapezoidal sectional surface perpendicular to the axial direction.

4. The secondary battery of claim 1, wherein at least one stepped part is formed at an upper part of the groove on the inner circumferential surface of the electrolytic solution injection hole.

5. The secondary battery of claim 1, wherein a first stepped part is formed at an upper part of the groove on the inner circumferential surface of the electrolytic solution injection hole, and a second stepped part is formed at an upper part of the first stepped part.

6. The secondary battery of claim 5, wherein a horizontal groove is formed on an upper surface of the first stepped part concentrically with respect to the electrolytic solution injection hole.

7. The secondary battery of claim 1, wherein an inclined part is formed at least one of an upper end and a lower end of the groove.

8. A secondary battery, comprising:
    an electrode assembly including a cathode plate, a separator and an anode plate;
    a can having an upper opening for receiving the electrode assembly; and
    a cap assembly which is combined with the upper opening of the can, and which is provided with a cap plate including an electrolytic solution injection hole formed at one side thereof;
    wherein a groove is formed in an axial direction on an inner circumferential surface of the electrolytic solution injection hole, a stepped part is formed at an upper part of the groove, and a sealing material is coated on a surface of the stepped part.

9. The secondary battery of claim 8, wherein a horizontal groove is formed on a plane surface of the stepped part concentrically with respect to the electrolytic solution injection hole, and is filled with the sealing material.

10. The secondary battery of claim 8, wherein the sealing material is formed by drying a solvent made of one of resin and rubber.

11. The secondary battery of claim 10, wherein the resin comprises one of a fluorine type resin and a polyolefin type resin, and the rubber comprises one of a fluorine type rubber, a butadiene rubber and an isobutylene-isoprene rubber.

12. The secondary battery of claim 8, wherein a second stepped part, having a diameter larger than a diameter of the electrolytic solution injection hole, is formed at an upper part of the stepped part.

* * * * *